July 5, 1966  S. STOKLAND  3,259,134
THRESHING CYLINDER
Filed March 2, 1965  2 Sheets-Sheet 1
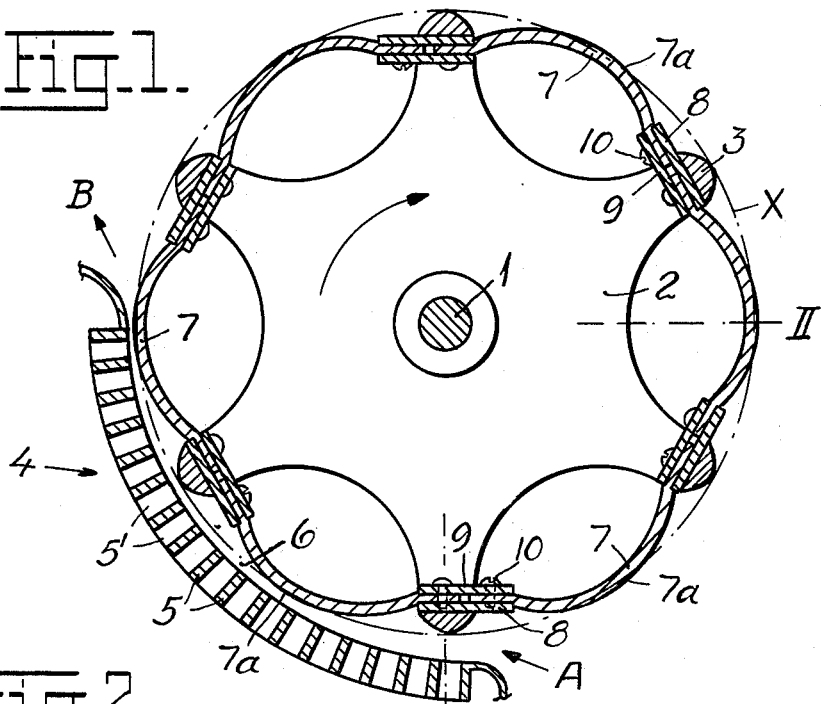
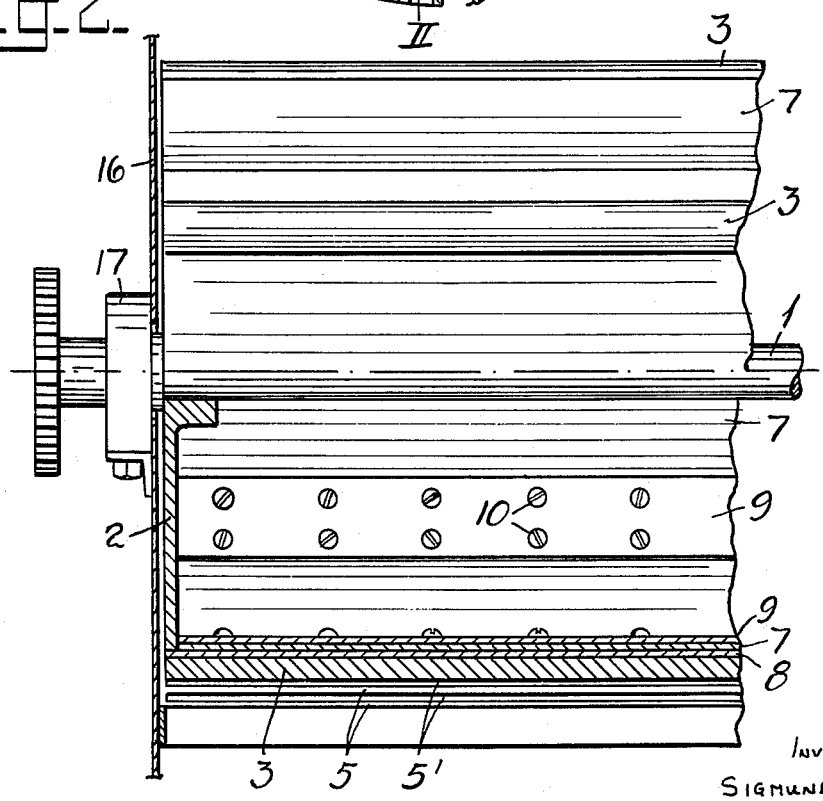
INVENTOR.
SIGMUND STOKLAND July 5, 1966   S. STOKLAND   3,259,134
THRESHING CYLINDER
Filed March 2, 1965   2 Sheets-Sheet 2

INVENTOR.
SIGMUND STOKLAND
BY
AGENT

United States Patent Office 3,259,134
Patented July 5, 1966

3,259,134
THRESHING CYLINDER
Sigmund Stokland, Brumunddal, Norway
Filed Mar. 2, 1965, Ser. No. 436,602
Claims priority, application Norway, Mar. 9, 1964,
152,341; Jan. 28, 1965, 156,536
4 Claims. (Cl. 130—27)

The present invention relates to threshing cylinder assemblies and more particularly to a threshing cylinder used with such assemblies.

Heretofore the threshing or separator cylinder used to separate grains and like farm crops from the growing stock has usually been of the type in which a plurality of beater bars are secured evenly spaced about a rotatable shaft radially spaced thereform so as to cooperate with a grate concave.

The beater bars are usually secured to the shaft by means of spiders, suitably arranged discs or the like so that free openings towards the shaft are left between the beater bars. It has, however, appeared that when the crop to be threshed, such as grain, is fed between the threshing cylinder and the grate concave and is beaten against the latter, the substantial part of the separated grain is passing through said concave, while part of it is reflected inwardly between the beater bars and thereby transported beyond the concave towards the straw outlet so that the percent of grain threshed out through the concave is reduced.

The object of the present invention is to provide a threshing cylinder of the type referred to by means of which the above drawback is removed and a maximum amount of grain separated through the grate concave is obtained.

According to the present invention this is attained by by completely closing the spaces between adjacent beater bars by means of elastic, yieldable, imperforate material which has or provides during operation of the cylinder in crosssection curved surface portions projecting outwardly between said bars with a greatest distance from the axis of the rotatable shaft approximately equal to the maximum operating radius of the beater bars.

By this arrangement the grain separated in beating the material against the concave is prevented from moving into the spaces between the beater bars as it impinges the outer curved surfaces of the elastic yieldable material which lead said grain through the grate concave and press the material against the surface of the concave so that grain left in the material is removed therefrom by friction.

The elastic yieldable material may consist of strip shaped sheets having their edge portions secured, preferably adjustably, to adjacent beater bars in order to close the space between same. Each of said sheets may either be preformed with an outwardly curved surface as above described, or be normally plane and having a thickness so adapted that when the cylinder rotates the cetrifugal force imparts to the sheet an outwardly arched shape the greatest distance of which from the axis of the cylinder is substantially similar to the operating radius of the beater bars.

Some embodiments of the invention are illustrated in the accompanying drawing in which:

FIG. 1 is a cross-sectional end view of a threshing cylinder of the instant invention and the operatively associated concave grate thereof.

FIG. 2 is a framentary side view partly in section along the line II—II in FIG. 1.

Figure 3:
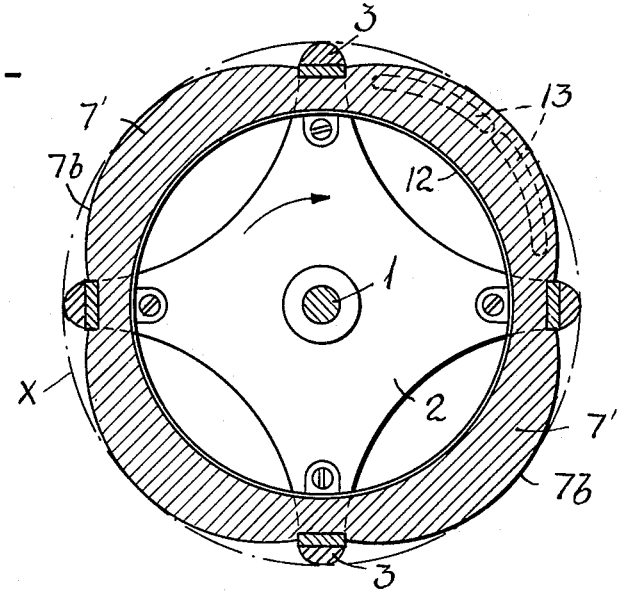
FIG. 3 is a cross-sectional view similar to FIG. 1 of another embodiment of the invention.

The structural novelty of the present invention is confined to the cylinder and immediate appurtenant parts, which may conveniently be structurally embodied in any of several known types of separating or threshing equipments in which the cylinder and concave assembly is mounted in a cylinder casing provided with lateral openings for the reception and discharge respectively of material to be threshed and threshed material, and in which the means for feeding the material to the separating assembly may be of conventional form, so that a detailed description thereof is not necessary.

In the drawing 1 denotes the shaft of the threshing cylinder about which, by means of spider or disc-shaped support members 2, a plurality of beater bars 3 are secured in evenly distributed and radially spaced relationship. The beater bars 3 cooperate with a grate concave 4. The shaft 1 of the cylinder is revolvably mounted in a cylinder casing 16, of which an end plate is shown in FIG. 2, by means of bearings 17 carried by the end plates of said casing.

The concave portion 4 of the cylinder casing extends substantially over the length of the cylinder casing and over a portion of its circumference. It consists essentially of bars 5 parallel to the shaft 1 and defining interstices 5′, said concave portion being positioned in relation to the maximum operating circle X of the beater bars so that between said circle and concave a gap 6 is formed having a radial height decreasing slightly from the inlet to the outlet of said gap, the material to be threshed being fed into the gap 6 in the direction of the arrow A and threshed material moved out in the direction of the arrow B.

As shown in FIG. 1, the spaces between adjacent beater bars 3 are closed by elastic yieldable sheets 7 of rubber, plastic or the like, having an outwardly curved surface 7a extending between said bars and having a greatest distance from the axis of rotation of the cylinder approximately equal to the radius of the operating circle X of the bars 3. The sheet 7 may be strip shaped rubber which preferably has a smooth surface and which may be reinforced by means of layers of cord or similar flexible or yieldable reinforcement.

The sheet or strip 7, extends substantially over the length of the beater bars and each edge portion thereof is adjustably clamped between the inner side of the respective beater bar, or a clamping plate 8 secured thereto, and a clamping member 9 secured to the plate 8 by means of screws 10. The sheets or strips 7 may be of such width and clamped with such curving that during rotation of the cylinder, a substantially part of the arch of the surface 7a becomes approximately parallel to the operating circle X of the beater bars whereby the rubbing effect of the strip is increased.

In order to provide and retain the desired shape of the curvature of the surface of the strip the thickness of the strip may vary in the transverse direction or the strip may on the inner side be provided with longitudinal ribs or the like serving as load.

If the circumferential distance between the beater bars 3 is increased, such as by reduction in the numbers thereof, provision must be made to provide the correct control and adaptation of the shape of the yieldable surface and the radial distance thereof from the cylinder axis, and an embodiment allowing this is shown in FIG. 3.

In this construction a tubular member 7′ of elastic yieldable material, such as rubber or plastic or the like, is secured concentrically about the shaft 1, preferably supported on a sheet metal cylinder 12 the ends of which are secured to the respective support members 2 for beater bars 3. Circumferential portions of the tubular 7′ extending between the beater bars 3 are of outwardly convex shape defined in cross-section by a smooth curve 7b which extends between adjacent bars 3.

Said surface portions defined by the curves 7b also are so formed that the maximum distance thereof from the cylinder axis is approximately equal to the radius of the effective operating circle X of the rotating bars 3. For certain purposes it may be advantageous to select said distance so that the surfaces project beyond the circle X toward the concave 4.

In order to increase the yieldability of the surface portion of the ring shaped member 7a it may be provided with cavities extending parallel to the cylinder axis, such as indicated at 13.

Figure 4:
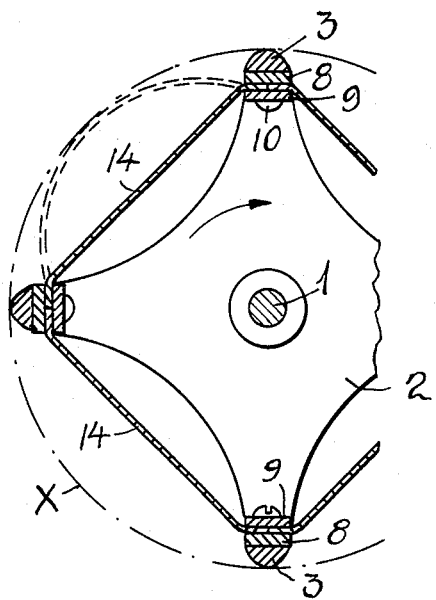
FIG. 4 is a cross-sectional end view of a framentary section of a further embodiment of the threshing cylinder.

In order to regulate the counter pressure of the strip shaped sheets secured between adjacent beater bars, as shown in FIG. 1, said sheets may be formed and arranged as shown in FIG. 4.

In this embodiment each of the spaces between adjacent beater bars 3 is closed by means of a plane strip shaped sheet 14 of elastic yieldable material having its edge portions secured to the respective bars 3, by means of a clamping plate 8 secured thereto and a clamping member 9, as in the construction shown in FIG. 1.

The strip shaped sheets extending along chords between adjacent bars of the cylinder, are of such thickness and elasticity that during the rotation of the cylinder, which may have a speed up to about 800 r.p.m., the centrifugal force imparts to the sheets by stretching of the material thereof an outwardly arched shape, as shown in broken lines in FIG. 4, having a greatest distance from the axis of the cylinder approximately equal to the maximum operating radius of the beater bars. In this manner the rebound force of the stretched elastic material reduces the counter pressure exercised by said strip shaped sheets 14.

I claim:

1. In a thresher for grain and the like and including a separator casing and concave structure, a bar-type separator cylinder assembly including a shaft, a plurality of beater bars secured evenly distributed around said shaft and radially spaced therefrom, an imperforate strip shaped sheet of elastic yieldable material completely closing each of the spaces between adjacent beater bars and providing during operation of said cylinder an outwardly curved surface having a greatest distance from the cylinder axis substantially equal to the operating radius of said beater bars, and means connecting the edge portions of said strip shaped sheet to the respective beater bars.

2. In a thresher as set forth in claim 1, said strip shaped sheet being normally plane and of a material of such thickness and elasticity that during operation of the cylinder the centrifugal force imparts to said sheet an outwardly arched shape.

3. In a thresher for grain and the like and including a separator casing and concave structure, a bar-type separator cylinder assembly including a shaft, a plurality of beater bars secured evenly distributed around said shaft and radially spaced therefrom tubular member of elastic yieldable material mounted concentrically about said shaft and extending over the substantial length of the cylinder, said tubular member having curved surface portions projecting outwardly between adjacent beater bars and completely closing the space between same, said curved surface portions having a greatest radial distance from the cylinder axis substantially equal to the maximum operating radius of the beater bars and a smallest radial distance substantially smaller than said greatest distance.

4. In a thresher for grain and the like and including a separator casing and concave structure, a bar-type, rotary separator cylinder assembly comprising:
    (a) a shaft having an axis;
    (b) a plurality of beater bars evenly distributed about said shaft and radially spaced therefrom, adjacent pairs of said bars defining spaces therebetween; and
    (c) a plurality of elastic, yieldable sheet means,
        (1) each sheet means, during operation of said assembly, providing an outwardly curved, imperforate surface extending between the bars of a respective pair and closing the space defined therebetween,
        (2) one portion of said surface having a greatest distance from said axis being spacedly interposed between the bars of the associated pair, and two other portions of said surface having a distance from said axis smaller than said greatest distance being interposed between said one portion and the bars of said pair respectively.

References Cited by the Examiner

UNITED STATES PATENTS

| | | | |
|---|---|---|---|
| 5,588 | 5/1848 | Warren | 130—27.85 |
| 641,200 | 1/1900 | Ferri | 130—27.85 |
| 3,087,499 | 4/1963 | Carmichael et al. | 130—30 |
| 3,127,898 | 4/1964 | Klemm et al. | 130—27.8 |

ABRAHAM G. STONE, *Primary Examiner.*

J. O. BOLT, JR., W. A. SMITH, III,
*Assistant Examiners.*